United States Patent [19]
Asao et al.

[11] 3,719,050
[45] March 6, 1973

[54] SOIL STABILIZATION METHOD
[75] Inventors: Hiroshi Asao, Yokohama; Takeshi Hihara, Zushi; Seiji Endo, Yokosuka; Chikashi Furuya, Kashiwa; Kouhei Sano, Yokohama, all of Japan

[73] Assignee: Toho Chemical Industry Co., Ltd., Tokyo, Japan

[22] Filed: June 1, 1970

[21] Appl. No.: 42,477

[52] U.S. Cl. ................................ 61/36 R, 166/295
[51] Int. Cl. ........................ E02d 3/14, E21b 33/138
[58] Field of Search..61/36 R; 166/295, 294; 264/48; 260/2.5 AK, 2.5 AB, 2.5 AT, 29.2 TN

[56] References Cited

UNITED STATES PATENTS

| | | | |
|---|---|---|---|
| 2,948,691 | 8/1960 | Windemuth et al. | 260/29.2 TN |
| 3,242,230 | 3/1966 | Habib | 260/29.2 TN |
| 3,181,611 | 5/1965 | Dollarhide | 166/295 |
| 2,867,278 | 1/1959 | Mallory et al. | 166/295 |
| 3,223,163 | 12/1965 | Koch et al. | 61/36 R |
| 2,838,466 | 6/1958 | Padbury et al. | 61/36 R |
| 3,286,475 | 11/1966 | Adams | 61/36 R |
| 3,367,892 | 2/1968 | Jorczak et al. | 166/295 |

*Primary Examiner*—Stephen J. Novosad
*Attorney*—Karl W. Flocks

[57] ABSTRACT

A soil stabilization method comprising injecting a polyurethane prepolymer having terminal isocyanate groups, alone or in admixture with water, obtained by the reaction of compound having at least two terminal hydroxy groups and a polyoxyalkylene chain having a molecular weight of from 300 to 20,000 with a polyisocyanate compound in a molar amount at least equal to the number of said hydroxyl groups and reacting said polyurethane prepolymer with water in the soil to solidify the same. The gelling time of said polyurethane prepolymer is shortened by the addition of a basic material and prolonged by the addition of an acidic material or a chelate compound. Said method provides simultaneously an excellent soil stabilizing effect and a water-cutting off effect. Injection of a mixture of said polyurethane prepolymer and inorganic materials, for example, clay, cement and the like into the soil results in the formation of an elastomer which has extremely excellent strength and is strongly adhered to the soil, whereby the soil is markedly improved.

20 Claims, No Drawings

SOIL STABILIZATION METHOD

The present invention relates to a novel soil stabilization method.

The previous soil stabilization method by means of the chemical grout comprises applying a mixture of a major amount of a monomer, such as acrylamides, water glass (sodium silicate), chrome lignin, polyamines, ureas and the like with adjuvants, curing agents, stabilizers and the like and forming a water-containing gel. The soil stabilization method by the chemical grout has the following defects.

1. In order to permit a stable gelling time control in the soil, a two-liquid system is often employed and there are used many kinds of the liquid components such as the main components, curing agents, stabilizers, adjuvants and the like, which makes the compounding operation more complicated.

2. The composition of the inorganic and organic materials in the soil is not constant, and particularly, it is difficult to control chemical reaction between the two liquids in the acidic soil or in the alkaline soil.

3. When much water is present in the soil or water is flowing through the soil, the chemical grout is diluted and often allowed to flow out without being solidified.

4. Since the alkaline component and the acidic component in the chemical grout are selectively separated and adsorbed, respectively, in the acidic soil and in the alkaline soil, the liquid chemicals are, in some cases, allowed to flow out without being solidified.

An object of the present invention is to provide a method for stabilizing soil by use of a treating agent which is homogeneously soluble or dispersible in water, and reactable with water to be solidified.

Another object of the present invention is to provide a soil stabilizing method having no defects seen in conventional processes.

Other objects and effects of the present invention will be apparent to those skilled in the art from the following description.

The present invention provides a soil stabilizing method which comprises injecting a mixture of water and a polyurethane prepolymer having terminal isocyanate groups which is soluble or dispersible homogeneously in water and reactable with water to be solidified into soil and solidifying the same in the soil or injecting directly said polyurethane prepolymer into the soil and reacting the same with water present in the soil to solidify the same therein.

The polyurethane prepolymer employed in the present invention is obtained by reacting a compound having at least two hydroxyl groups at the terminals and having a polyoxyalkylene chain having a molecular weight of from 300 to 20,000 (referred to hereinafter as a polyalkylene oxide compound), with a polyisocyanate compound in a molar amount at least equal to the number of said hydroxyl groups at a temperature of 30°C to 120°C for 30 min. to 7 days in the presence, if necessary, of a catalyst such as dibutyl tin laurate or triethylene diamine, to introduce an isocyanate group at both ends of the polyalkylene oxide compound. Said polyurethane prepolymer is liquid or pasty at room temperature, and when added to 97 to 85 percent by weight of water, is readily dissolved therein to form a transparent solution or dispersed homogeneously therein to form an emulsion. The aqueous solution or emulsion is converted in a period of 20 sec. to 2 hrs. a water-insoluble water-containing plastic material having a high elasticity. Since the carbon dioxide gas produced in the polymerization of the urethane prepolymer by the cross-linking reaction with water is dissolved in the water present in the system, the resultant water-containing plastic material is a gel, the volume of which is little increased owing to gas-formation. In this case, it is possible to polymerize and gel a mixture of the polyurethane prepolymer and water in an amount about 50 or less times, preferably 20 or less times the weight of the prepolymer.

The time between the addition of polyurethane prepolymer to water and the solidification thereof (referred to hereinafter as gelling time) can be shortened by the addition of a basic material, such as an amine compound, and prolonged by the addition of an acidic material such as an acid chloride or a chelate compound.

Excellent soil stabilizing effect and water-cutting off effect can be obtained by injecting these components into the soil by a one-liquid one-system type or a two-liquid one-system type injection method. It is also possible to form a protective layer in the surface part of a slope composed of soil and prevent thereby the slope from being eroded by a rain by sprinkling a mixture of the polyurethane prepolymer and water over the slope and allowing the mixture to be percolated into the slope, wherein the two components are allowed to react with each other.

Furthermore, it is possible to sprinkle said mixture over a weak ground or admix the mixture with soil of the surface part of such ground to form a protective layer, whereby vehicles are enabled to pass thereon. In the application to the slope, water may previously be sprinkled and then the polyurethane prepolymer may be sprinkled and then the polyurethane prepolymer may be sprinkled alone, or the polyurethane prepolymer may be firstly sprinkled and then water may be sprinkled.

When the polyurethane prepolymer is added to 85 to 50 percent by weight of water, the strength of the formed gel is further increased and the gel is expanded. The mixture has excellent properties as a soil-injecting agent, and, when mixed with inorganic materials such as clay, cement and the like and then injected into soil, it forms an elastomer which has an extremely excellent strength and is strongly adhered to the soil, whereby the soil is markedly improved.

Particularly, when water is present in a large amount or is flowing through soil, solidification of the soil or water-cutting off can be achieved by injecting the polyurethane prepolymer as such without dilution into the soil and reacting the same with water present in the soil.

In this case, the expansibility due to the gas-formation is also good in the soil, and the dispersibility and solubility of the polyurethane prepolymer in water is also good owing to the surface active property of the polyurethane prepolymer itself. Therefore, the percolatability thereof into the soil is excellent.

The polyalkylene oxide compounds employed in the present invention are compounds having at least two terminal hydroxyl groups obtained by adding an alkylene oxide in a long chain state to a compound having active hydrogen.

The active hydrogen-containing compounds include polyols such as ethylene glycol, glycerin, trimethylol propane, trimethylol ethane, pentaerythritol, sorbitol, sucrose, and methylglycoside; amines such as ethylenediamine, diethylenetriamine and methylamine; castor oil, tall oil, carboxylic acids such as rosin, and compounds having at least two hydroxyl groups obtained by the reaction of aldehydes with other compounds (for example, olefins, aromatic hydrocarbons and the like).

The polyalkylene oxide compounds obtained by the addition reaction of ethylene oxide as a major component and other alkylene oxides as a minor component, preferably in a weight ratio of from 90/10 to 70/30, to these active hydrogen-containing compounds and a mixture thereof have excellent solubility in water, and it is desirable that the polyalkylene oxide compound has a polyalkylene oxide chain of such a length as not to impair the percolatability of the polyurethane prepolymer obtained by reaction thereof with a polyisocyanate into the desired area of the stratum when an aqueous solution of the polyurethane prepolymer is injected into soil in view of the solubility of the prepolymer in water and the viscosity of the aqueous solution. However, the polyalkylene oxide compounds may also have a polyalkylene oxide chain and a molecular weight of such a size that an percolatability to the same extent can be given by the addition of dispersing agents, solubilizers and the like. Therefore, it is suitable that the polyols have a molecular weight of from 300 to 20,000, desirably from 1,000 to 4,000. Other polyalkylene oxide compounds may also have a molecular weight of the same range.

For the synthesis of the polyurethane prepolymer in the present invention, 2 to 8 moles of a polyisocyanate compound is employed per mole of a polyalkylene oxide compound and the proportion is selected according to the number of the hydroxyl groups in the molecule of the polyalkylene oxide compound. The proportion is determined in such a range that the size of the molecular weight of the resultant polyurethane prepolymer does not markedly increase the viscosity of an aqueous solution of the polyurethane prepolymer and does not adversely affect the dissolution of the polyurethane prepolymer in water.

The polyisocyanate compounds employed in the present invention are organic compounds having at least two isocyanate groups. As such compounds, there are employed, for example, diisocyanate compounds such as tolylene diisocyanate, diphenylmethane diisocyanate, diphenyl diisocyanate, naphthalene diisocyanate, xylylene diisocyanate, hexamethylene diisocyanate and the like; triisocyanate compounds such as triphenylmethane triisocyanate and the like. The alkylene oxides employed in the present invention include ethylene oxide (referred to hereinafter as EO), propylene oxide (referred to hereinafter as PO), butylene oxide (referred to hereinafter as BO), styrene oxide (referred to hereinafter as SO) and epichlorohydrin (referred to hereinafter as EpCl).

PREPARATION EXAMPLE 1.

One hundred parts by weight of polyoxyethylene glycol having an average molecular weight of 1,000 was reacted with 52.5 parts by weight of tolylene diisocyanate at 90°C for 2 hrs. to yield a reaction product (referred to hereinafter as Prepolymer (1)).

PREPARATION EXAMPLE 2

Two hundred parts by weight of polyoxyethylene glycol having an average molecular weight of 2,000 was reacted with 52.5 parts by weight of tolylene diisocyanate at 90°C for 3 hrs. to yield a reaction product (referred to hereinafter as Prepolymer (2)).

PREPARATION EXAMPLE 3

Two hundred parts by weight of a copolymer diol having an average molecular weight of 2,000 and comprising 85 parts by weight of ethylene oxide and 15 parts by weight of propylene oxide (referred to hereinafter as an EO/PO (85/15) copolymer diol) was reacted with 52.2 parts by weight of tolylene diisocyanate at 90°C for 3 hrs. to yield a reaction product (referred to hereinafter as Prepolymer (3))

PREPARATION EXAMPLE 4

Two hundred parts by weight of an EO/PO (90/10) copolymer diol having an average molecular weight of 3,000 was reacted with 52.2 parts by weight of tolylene diisocyanate at 90°C for 3 hrs. to yield a reaction product (referred to hereinafter as Prepolymer (4)).

PREPARATION EXAMPLE 5

Two hundred parts by weight of polyoxyethylene glycol having an average molecular weight of 4,000 was reacted with 52.5 parts by weight of tolylene diisocyanate at 90°C for 2 hrs. to yield a reaction product (referred to hereinafter as Prepolymer (5)).

PREPARATION EXAMPLE 6

Two hundred parts by weight of an EO/PO (85/15) copolymer diol having an average molecular weight of 2,000 was reacted with 26.1 parts by weight of tolylene diisocyanate and 28.2 parts by weight of xylylene diisocyanate at 90°C for 3 hrs. to yield a reaction product (referred to hereinafter as prepolymer (6)).

PREPARATION EXAMPLE 7

Two hundred parts by weight of an EO/PO (85/15) copolymer diol having an average molecular weight of 2,000 was reacted with 26.1 parts by weight of tolylene diisocyanate and 38 parts by weight of diphenylmethane diisocyanate at 80°C for 2 hrs. to yield a reaction product (referred to hereinafter as Prepolymer (7)).

PREPARATION EXAMPLE 8

Two hundred parts by weight of an EO/PO (85/15) copolymer diol having an average molecular weight of 2,000 was reacted with 75 parts by weight of diphenylmethane diisocyanate at 80°C for 2 hrs. to yield a reaction product (referred to hereinafter as Prepolymer (8)).

PREPARATION EXAMPLE 9

Three hundred parts by weight of a triol having an average molecular weight of 3,000 obtained by copolymerizing glycerin with ethylene oxide and propylene oxide in a weight ratio of 90 : 10 was reacted with 52.2 parts by weight of tolylene diisocyanate at 90°C for 3 hrs. to yield a reaction product (referred to hereinafter as Prepolymer (9)).

PREPARATION EXAMPLE 10

Six hundred parts by weight of a triol having an average molecular weight of 6,000 obtained by copolymerizing glycerin with ethylene oxide and propylene oxide in a weight ratio of 80 : 20 was reacted with 52.2 parts by weight of tolylene diisocyanate at 90°C for 3 hrs. to yield a reaction product (referred to hereinafter as Prepolymer (10)).

PREPARATION EXAMPLE 11

Three hundred parts by weight of a triol having an average molecular weight of 3,000 obtained by copolymerizing glycerin with ethylene oxide and propylene oxide in a weight ratio of 90 : 10 was reacted with 76.0 parts by weight of diphenylmethane diisocyanate at 80°C for 2 hrs. to yield a reaction product (referred to hereinafter as Prepolymer (11)).

PREPARATION EXAMPLE 12

Three hundred parts by weight of a triol having an average molecular weight of 3,000 obtained by copolymerizing glycerin with ethylene oxide and propylene oxide in a weight ratio of 90 : 10 was reacted with 56.4 parts by weight of xylylene diisocyanate at 90°C for 5 hrs. to yield a reaction product (referred to hereinafter as Prepolymer (12)).

PREPARATION EXAMPLE 13

Three hundred parts by weight of a triol having an average molecular weight of 3,000 obtained by copolymerizing glycerin with ethylene oxide and propylene oxide in a weight ratio of 90 : 10 was reacted with 50.4 parts by weight of hexamethylene diisocyanate at 70°C for 2 hrs. in the presence of 0.015 part by weight of a dibutyl tin dilaurate catalyst to yield a reaction product (referred to hereinafter as Prepolymer (13)).

PREPARATION EXAMPLE 14

Three hundred parts by weight of a tetraol having an average molecular weight of 3,000 obtained by copolymerizing ethylene-diamine with ethylene oxide and propylene oxide in a weight ratio of 85 : 15 was reacted with 69.5 parts by weight of tolylene diisocyanate at 80°C for 2 hours to yield a reaction product (referred to hereinafter as Prepolymer (14)).

PREPARATION EXAMPLE 15

Four hundred parts by weight of a hexaol having an average molecular weight of 4,000 obtained by copolymerizing sorbitol with ethylene oxide and propylene oxide in a weight ratio of 80 : 20 was reacted with 104.4 parts by weight of tolylene diisocyanate at 90°C for 3 hrs. to yield a reaction product (referred to hereinafter as Prepolymer (15)).

PREPARATION EXAMPLE 16

Four hundred parts by weight of a hexaol having an average molecular weight of 4,000 obtained by copolymerizing sorbitol with ethylene oxide and propylene oxide in a weight ratio of 80 : 20 was reacted with 100.8 parts by weight of hexamethylene diisocyanate at 70°C for 2 hrs. in the presence of 0.02 part by weight of a dibutyl tin dilaurate catalyst to yield a reaction product (referred to hereinafter as Prepolymer (16)).

PREPARATION EXAMPLE 17

Four hundred parts by weight of a polyol having an average molecular weight of 4,000 obtained by adding ethylene oxide to caster oil and polymerizing the same was reacted with 52.2 parts by weight of tolylene diisocyanate at 90°C for 2 hrs. to yield a reaction product (referred to hereinafter as Prepolymer (17)).

PREPARATION EXAMPLE 18

400 parts by weight of an octaol having an average molecular weight of 4,000 prepared from an aromatic unsaturated compound having 9 carbon atoms in the petroleum distillate, vinyl acetate monomer and ethylene oxide were reacted with 140 parts by weight of tolylene diisocyanate at 90°C for 2 hrs. to yield a reaction product (referred to hereinafter as Propolymer (18)).

PREPARATION EXAMPLE 19

Three hundred parts by weight of a triol having an average molecular weight of 3,000 obtained by copolymerizing glycerin with 95 parts by weight of ethylene oxide and 5 parts by weight of styrene oxide was reacted with 52.2 parts by weight of tolylene diisocyanate at 90°C for 3 hrs. to yield a reaction product (referred to hereinafter as Prepolymer (19)).

PREPARATION EXAMPLE 20

One hundred and fifty parts by weight of an EO/PO (90/10) copolymer diol having an average molecular weight of 3,000 and 5 parts by weight of hexaol having an average molecular weight of 300 obtained by addition-polymerization of ethylene oxide and sorbitol was reacted with 52.2 parts by weight of tolylene diisocyanate at 90°C for 3 hrs. to yield a reaction product (referred to hereinafter as Prepolymer (20)).

PREPARATION EXAMPLE 21

Three hundred parts by weight of a diol having an average molecular weight of 3,000 prepared from an aromatic unsaturated compound having 9 carbon atoms in a petroleum distillate, formaldehyde and ethylene oxide was reacted with 52.2 parts by weight of tolylene diisocyanate at 90°C for 2 hrs. to yield a reaction product (referred to hereinafter as Prepolymer (21)).

PREPARATION EXAMPLE 22

200 parts by weight of an EO/SO (90/10) copolymer diol having an average molecular weight of 3,000 was reacted with 52.2 parts by weight of tolylene diisocyanate at 90°C for 3 hrs. to yield a reaction product (referred to hereinafter as Prepolymer (22)).

PREPARATION EXAMPLE 23

200 parts by weight of an EO/BO (90/10) copolymer diol having an average molecular weight of 3,000 was reacted with 52.2 parts by weight of tolylene diisocyanate at 90°C for 5 hrs. to yield a reaction product (referred to hereinafter as Prepolymer (23)).

PREPARATION EXAMPLE 24

Two hundred parts by weight of an EO/EpCl (95/5) copolymer diol having an average molecular weight of 2,000 was reacted with 52.2 parts by weight of tolylene diisocyanate at 90°C for 3 hrs. to yield a reaction product (referred to hereinafter as Prepolymer (24)).

cyanate at 90°C for 3 hrs. to yield a reaction product (referred to hereinafter as Prepolymer (25)).

Prepolymers (1) to (8) were pasty or liquid at room temperature, and they were rapidly dispersed in water on adding to water to form an emulsion, which was then solidified as it was elastomer.

The relationship between the amount of said prepolymers added to water and the gelling time and the relationship between the amount of an inhibitor added and the gelling time were as shown in Table 1. The inhibitor employed was p-nitrobenzoyl chloride. The temperature of water and prepolymer and the atmospheric temperature were all 20°C.

TABLE 1

| Kind of prepolymer | Prepolymers (parts by weight) | Water (parts by weight) | Inhibitor (parts by weight) | Gelling time (min., sec.) | Expansion (folds) | Form of gel |
|---|---|---|---|---|---|---|
| Prepolymer (1) | 5 | 95 | 0 | 3.50 | 1.1 | Uniform, rubber-like. |
|  | 10 | 90 | 0 | 2.35 | 1.2 | Do. |
|  | 15 | 85 | 0 | 2.00 | 1.4 | Rubber-like foam. |
|  | 20 | 80 | 0 | 1.45 | 1.7 | Do. |
| Do | 10 | 90 | 0.01 | 3.10 | 1.2 | Uniform, rubber-like. |
|  | 10 | 90 | 0.05 | 5.50 | 1.15 | Do. |
|  | 10 | 90 | 0.10 | 9.15 | 1.05 | Uniform, jelly-like. |
| Prepolymer (2) | 5 | 95 | 0 | 4.45 | 1.1 | Uniform, rubber-like. |
|  | 10 | 90 | 0 | 3.10 | 1.2 | Do. |
|  | 15 | 85 | 0 | 2.25 | 1.4 | Do. |
|  | 20 | 80 | 0 | 2.50 | 1.7 | Rubber-like foam. |
| Do | 10 | 90 | 0.01 | 3.40 | 1.2 | Uniform, rubber-like. |
|  | 10 | 90 | 0.05 | 6.30 | 1.15 | Do. |
|  | 10 | 90 | 0.10 | 11.10 | 1.10 | Uniform, jelly-like. |
| Prepolymer (3) | 5 | 95 | 0 | 5.50 | 1.1 | Uniform, rubber-like. |
|  | 10 | 90 | 0 | 3.15 | 1.2 | Do. |
|  | 15 | 85 | 0 | 2.30 | 1.4 | Do. |
|  | 20 | 80 | 0 | 2.10 | 1.6 | Rubber-like foam. |
| Do | 10 | 90 | 0.01 | 3.45 | 1.2 | Uniform, rubber-like. |
|  | 10 | 90 | 0.05 | 6.45 | 1.15 | Do. |
|  | 10 | 90 | 0.10 | 11.35 | 1.10 | Uniform, jelly-like. |
| Prepolymer (4) | 5 | 95 | 0 | 5.30 | 1.1 | Uniform, rubber-like. |
|  | 10 | 90 | 0 | 3.30 | 1.2 | Do. |
|  | 15 | 85 | 0 | 2.45 | 1.3 | Do. |
|  | 20 | 80 | 0 | 2.20 | 1.5 | Rubber-like foam. |
| Do | 10 | 90 | 0.01 | 4.50 | 1.2 | Uniform, rubber-like. |
|  | 10 | 90 | 0.05 | 7.10 | 1.2 | Do. |
|  | 10 | 90 | 0.10 | 12.20 | 1.15 | Uniform, jelly-like. |
| Prepolymer (5) | 5 | 95 | 0 | 5.15 | 1.1 | Uniform, rubber-like. |
|  | 10 | 90 | 0 | 3.25 | 1.2 | Do. |
|  | 15 | 85 | 0 | 2.40 | 1.4 | Rubber-like foam. |
|  | 20 | 80 | 0 | 2.20 | 1.7 | Do. |
| Do | 10 | 90 | 0.01 | 3.50 | 1.2 | Uniform, rubber-like. |
|  | 10 | 90 | 0.05 | 7.10 | 1.2 | Do. |
|  | 10 | 90 | 0.10 | 12.55 | 1.10 | Uniform, jelly-like. |
| Prepolymer (6) | 5 | 95 | 0 | 10.20 | 1.1 | Uniform, rubber-like. |
|  | 10 | 90 | 0 | 6.30 | 1.2 | Do. |
|  | 15 | 85 | 0 | 5.10 | 1.3 | Do. |
|  | 20 | 80 | 0 | 3.40 | 1.4 | Rubber-like foam. |
| Do | 10 | 90 | 0.01 | 6.50 | 1.15 | Uniform, rubber-like. |
|  | 10 | 90 | 0.05 | 9.25 | 1.15 | Do. |
|  | 10 | 90 | 0.10 | 13.10 | 1.05 | Uniform, jelly-like. |
| Prepolymer (7) | 5 | 95 | 0 | 3.50 | 1.1 | Uniform, rubber-like. |
|  | 10 | 90 | 0 | 2.15 | 1.2 | Do. |
|  | 15 | 85 | 0 | 1.55 | 1.4 | Rubber-like foam. |
|  | 20 | 80 | 0 | 1.40 | 1.7 | Do. |
| Do | 10 | 90 | 0.01 | 2.35 | 1.2 | Uniform, rubber-like. |
|  | 10 | 90 | 0.05 | 4.40 | 1.2 | Do. |
|  | 10 | 90 | 0.10 | 7.20 | 1.15 | Do. |
| Prepolymer (8) | 5 | 95 | 0 | 3.30 | 1.1 | Do. |
|  | 10 | 90 | 0 | 1.10 | 1.2 | Do. |
|  | 15 | 85 | 0 | .55 | 1.4 | Rubber-like foam. |
|  | 20 | 80 | 0 | .40 | 1.6 | Do. |
| Do | 10 | 90 | 0.01 | 1.50 | 1.2 | Uniform, rubber-like. |
|  | 10 | 90 | 0.05 | 2.55 | 1.2 | Do. |
|  | 10 | 90 | 0.10 | 4.40 | 1.2 | Do. |

PREPARATION EXAMPLE 25

Five hundred parts by weight of a polyoxyethylene glycol having an average molecular weight of 10,000 was reacted with 52.2 parts by weight of tolylene diiso- The prepolymers from (9) to (19) were liquid at room temperature and dissolved in water on adding to water to form a transparent solution, which was then solidified as it was into an agar-like material. The relationship between the amount of said prepolymers added to water and the gelling time, and the relationship between the amount of an accelerator added and the gelling time were as shown in Table 2.

The accelerator used was m-tolylene diamine. The temperatures of the water and the prepolymer and the atmospheric temperature were all 20°C.

TABLE 2

| Kind of prepolymer | Prepolymers (parts by weight) | Water (parts by weight) | Accelerator (parts by weight) | Gelling time (min., sec.) | Expansion (folds) | Form of gel |
|---|---|---|---|---|---|---|
| Prepolymer (9) | 5 | 95 | 0 | .46 | 1.05 | Uniform, agar-like. |
|  | 10 | 90 | 0 | .37 | 1.10 | Do. |
|  | 15 | 85 | 0 | .27 | 1.15 | Do. |
|  | 20 | 80 | 0 | .22 | 1.40 | Agar-like foam. |
| Do | 10 | 90 | 0.05 | .33 | 1.10 | Uniform, agar-like. |
|  | 10 | 90 | 0.10 | .29 | 1.15 | Do. |
|  | 10 | 90 | 0.20 | .14 | 1.15 | Do. |
| Prepolymer (10) | 5 | 95 | 0 | 1.50 | 1.10 | Do. |
|  | 10 | 90 | 0 | .55 | 1.10 | Do. |
|  | 15 | 85 | 0 | .45 | 1.15 | Do. |
|  | 20 | 80 | 0 | .37 | 1.20 | Do. |
| Do | 10 | 90 | 0.05 | .52 | 1.10 | Do. |
|  | 10 | 90 | 0.10 | .45 | 1.10 | Do. |
|  | 10 | 90 | 0.20 | .32 | 1.15 | Do. |
| Prepolymer (11) | 5 | 95 | 0 | .35 | 1.05 | Do. |
|  | 10 | 90 | 0 | .24 | 1.10 | Do. |
|  | 15 | 85 | 0 | .16 | 1.20 | Do. |
|  | 20 | 80 | 0 | .90 | 1.60 | Agar-like foam. |
| Do | 10 | 90 | 0.05 | .20 | 1.10 | Uniform, agar-like. |
|  | 10 | 90 | 0.10 | .16 | 1.15 | Do. |
|  | 10 | 90 | 0.20 | .50 | 1.20 | Do. |
| Prepolymer (12) | 5 | 95 | 0 | 4.20 | 1.10 | Do. |
|  | 10 | 90 | 0 | 2.20 | 1.15 | Do. |
|  | 15 | 85 | 0 | 2.10 | 1.20 | Do. |
|  | 20 | 80 | 0 | 1.45 | 1.30 | Agar-like foam. |
| Do | 10 | 90 | 0.05 | 2.10 | 1.15 | Uniform, agar-like. |
|  | 10 | 90 | 0.10 | 2.10 | 1.15 | Do. |
|  | 10 | 90 | 0.20 | 1.20 | 1.20 | Do. |
| Prepolymer (13) | 5 | 95 | 0 | 63.30 | 1.05 | Do. |
|  | 10 | 90 | 0 | 17.41 | 1.10 | Do. |
|  | 15 | 85 | 0 | 12.20 | 1.20 | Do. |
|  | 20 | 80 | 0 | 10.50 | 1.40 | Agar-like foam. |
| Do | 10 | 90 | 0.05 | 9.30 | 1.10 | Uniform, agar-like. |
|  | 10 | 90 | 0.10 | 4.45 | 1.15 | Do. |
|  | 10 | 90 | 0.20 | 2.90 | 1.20 | Do. |
| Prepolymer (14) | 5 | 95 | 0 | .28 | 1.15 | Do. |
|  | 10 | 90 | 0 | .23 | 1.25 | Do. |
|  | 15 | 85 | 0 | .18 | 1.40 | Agar-like foam. |
|  | 20 | 80 | 0 | .15 | 1.70 | Do. |
| Do | 10 | 90 | 0.05 | .21 | 1.25 | Uniform, agar-like. |
|  | 10 | 90 | 0.10 | .15 | 1.30 | Do. |
|  | 10 | 90 | 0.20 | .30 | 1.30 | Do. |
| Prepolymer (15) | 5 | 95 | 0 | .50 | 1.10 | Do. |
|  | 10 | 90 | 0 | .41 | 1.15 | Do. |
|  | 15 | 85 | 0 | .33 | 1.20 | Do. |
|  | 20 | 80 | 0 | .25 | 1.30 | Do. |
| Do | 10 | 90 | 0.05 | .38 | 1.15 | Do. |
|  | 10 | 90 | 0.10 | .31 | 1.15 | Do. |
|  | 10 | 90 | 0.20 | .17 | 1.20 | Do. |
| Prepolymer (16) | 5 | 95 | 0 | 39.20 | 1.05 | Do. |
|  | 10 | 90 | 0 | 15.50 | 1.10 | Do. |
|  | 15 | 85 | 0 | 11.15 | 1.15 | Do. |
|  | 20 | 80 | 0 | 9.50 | 1.30 | Do. |
| Do | 10 | 90 | 0.05 | 7.10 | 1.15 | Do. |
|  | 10 | 90 | 0.10 | 4.50 | 1.15 | Do. |
|  | 10 | 90 | 0.20 | 1.40 | 1.20 | Do. |
| Prepolymer (17) | 5 | 95 | 0 | 1.52 | 1.15 | Do. |
|  | 10 | 90 | 0 | 1.38 | 1.20 | Do. |
|  | 15 | 85 | 0 | 1.18 | 1.40 | Agar-like foam. |
|  | 20 | 80 | 0 | .57 | 1.70 | Do. |
| Do | 10 | 90 | 0.05 | 1.32 | 1.20 | Uniform, agar-like. |
|  | 10 | 90 | 0.10 | 1.50 | 1.20 | Do. |
|  | 10 | 90 | 0.20 | .37 | 1.25 | Do. |
| Prepolymer (18) | 5 | 95 | 0 | 3.58 | 1.10 | Do. |
|  | 10 | 90 | 0 | 3.12 | 1.20 | Do. |
|  | 15 | 85 | 0 | 2.50 | 1.30 | Do. |
|  | 20 | 80 | 0 | 2.36 | 1.60 | Agar-like foam. |
| Do | 10 | 90 | 0.05 | 3.70 | 1.20 | Uniform, agar-like. |
|  | 10 | 90 | 0.10 | 1.40 | 1.25 | Do. |
|  | 10 | 90 | 0.20 | .56 | 1.25 | Do. |
| Prepolymer (19) | 5 | 95 | 0 | 1.35 | 1.05 | Do. |
|  | 10 | 90 | 0 | 1.18 | 1.10 | Do. |
|  | 15 | 85 | 0 | 1.20 | 1.15 | Do. |
|  | 20 | 80 | 0 | .47 | 1.20 | Do. |
| Do | 10 | 90 | 0.05 | 1.15 |  | Do. |
|  | 10 | 90 | 0.10 | .56 |  | Do. |
|  | 10 | 90 | 0.20 | .37 |  | Do. |

Prepolymers (20) to (23) were liquid at room temperature and Prepolymers (24) and (25) were soild at room temperature and dissolved in a solvent such as methyl ethyl ketone and the like to form a solution.

When added to water, these prepolymers are rapidly disperse therein to form an emulsion, which was then solidified as it was into a rubbery elastomer.

The relationship between the amount of each prepolymer added to water and the gelling time was as shown in Table 3. The inhibitor employed was p-nitrobenzoyl chloride. The temperatures of water and the polymer and the atmospheric temperature were all 20°C.

TABLE 3

| Kind of prepolymer | Prepolymer (parts by weight) | Water (parts by weight) | Inhibitor (parts by weight) | Gelling time (min., sec.) | Expansion (folds) | Form of gel |
|---|---|---|---|---|---|---|
| Prepolymer (20) | 5 | 95 | 0 | 5.25 | 1.10 | Uniform, rubber-like. |
|  | 10 | 90 | 0 | 3.45 | 1.20 | Do. |
|  | 15 | 85 | 0 | 3.00 | 1.30 | Do. |
|  | 20 | 80 | 0 | 2.35 | 1.60 | Rubber-like foam. |
| Do | 10 | 90 | 0.01 | 4.15 | 1.20 | Uniform, rubber-like. |
|  | 10 | 90 | 0.05 | 7.30 | 1.20 | Do. |
|  | 10 | 90 | 0.10 | 13.55 | 1.10 | Uniform, jelly-like. |
| Prepolymer (21) | 5 | 95 | 0 | 7.45 | 1.10 | Uniform, rubber-like. |
|  | 10 | 90 | 0 | 5.50 | 1.15 | Do. |
|  | 15 | 85 | 0 | 4.10 | 1.40 | Rubber-like foam. |
|  | 20 | 80 | 0 | 3.25 | 1.70 | Do. |
| Do | 10 | 90 | 0.01 | 5.40 | 1.15 | Uniform, rubber-like. |
|  | 10 | 90 | 0.05 | 10.50 | 1.10 | Do. |
|  | 10 | 90 | 0.10 | 23.30 | 1.10 | Uniform, jelly-like. |
| Prepolymer (22) | 5 | 95 | 0 | 24.20 | 1.10 | Uniform, rubber-like. |
|  | 10 | 90 | 0 | 11.40 | 1.15 | Do. |
|  | 15 | 85 | 0 | 9.30 | 1.20 | Do. |
|  | 20 | 80 | 0 | 5.45 | 1.40 | Rubber-like foam. |
| Do | 10 | 90 | 0.01 | 12.10 | 1.15 | Uniform, rubber-like. |
|  | 10 | 90 | 0.05 | 21.20 | 1.10 | Do. |
|  | 10 | 90 | 0.10 | 32.40 | 1.10 | Uniform, jelly-like. |
| Prepolymer (23) | 5 | 95 | 0 | 3.50 | 1.10 | Uniform, rubber-like. |
|  | 10 | 90 | 0 | 2.00 | 1.35 | Do. |
|  | 15 | 85 | 0 | 1.35 | 1.50 | Rubber-like foam. |
|  | 20 | 80 | 0 | 1.50 | 1.85 | Do. |
| Do | 10 | 90 | 0.01 | 2.10 | 1.30 | Uniform, rubber-like. |
|  | 10 | 90 | 0.05 | 4.30 | 1.15 | Do. |
|  | 10 | 90 | 0.10 | 6.50 | 1.10 | Uniform, jelly-like. |
| Prepolymer (24) | 5 | 95 | 0 | 19.30 | 1.05 | Do. |
|  | 10 | 90 | 0 | 10.55 | 1.05 | Uniform, rubber-like. |
|  | 15 | 85 | 0 | 8.50 | 1.10 | Do. |
|  | 20 | 80 | 0 | 6.30 | 1.20 | Do. |
| Do | 10 | 90 | 0.01 | 12.20 | 1.05 | Do. |
|  | 10 | 90 | 0.05 | 21.10 | 1.05 | Do. |
|  | 10 | 90 | 0.10 | 40.50 | 1.00 | Uniform, jelly-like. |
| Prepolymer (25) | 5 | 95 | 0 | 9.30 | 1.05 | Uniform, rubber-like. |
|  | 10 | 90 | 0 | 5.55 | 1.10 | Do. |
|  | 15 | 85 | 0 | 4.40 | 1.15 | Do. |
|  | 20 | 80 | 0 | 31.5 | 1.20 | Do. |
| Do | 10 | 90 | 0.01 | 6.10 | 1.05 | Do. |
|  | 10 | 90 | 0.05 | 11.50 | 1.05 | Do. |
|  | 10 | 90 | 0.10 | 17.10 | 1.05 | Uniform, jelly-like. |

In the following examples unconfined compression strength (referred to hereinafter as strength) and the modulus of deformation were measured according to JIS-A-1216. The coefficient of permeability was measured according to JIS-A-1218. In the Examples, "parts" and "%" are by weight unless otherwise specified.

EXAMPLE 1

A sample soil was prepared by compacting Toyoura standard sand to the maximum dry density in a mold in apparatus explained hereinafter. Ten parts of Prepolymer (1) of Preparation Example 1 and 90 parts of water were placed in a pressure pot and mixed with stirring therein, and the resulting mixture was injected into the sample soil from the bottom of the mold at a pressure of 0.5 kg/cm² for 3 min. and cured therein for a day.

The solidified product was subjected to measurement to find that the strength was 1.90 Kg/cm², the modulus of deformation, $E'_{50}$, was 32.7 Kg/cm² and the coefficient of permeability was $4.41 \times 10^{-6}$ cm/sec.

The mold in the injection apparatus was a steel cylinder having an inside diameter of 15 cm and a height of 17.5 cm, and the bottom thereof was comprised of a circular iron plate equipped with a ventilation cock and an injection cock, and the top thereof was comprised of a perforated plate. Toyoura standard sand was placed in the mold between the position 1 cm below the top of the mold and the position 16.5 cm below there and compacted to a 15.5 cm layer having the desired density. Both ends of the sand layer were supported by filter layers of 1.0 cm in thickness wire net and ballast.

The injection liquid was contained in a steel cylinder vessel, which was connected to an injection cock through a polyvinyl chloride tube, and the liquid was injected under pressure by means of a compressor.

EXAMPLE 2

Toyoura standard sand was compacted to a dry density of 1.631 g/cm³ in a sample preparation mold having an inside diameter of 5 cm and a height of 10 cm and provided with a top cover and a bottom cover. A mixture of Prepolymer (4) of Preparation Example 4 and water was injected into the compacted sand through an inlet of the bottom cover.

The frame was removed one hour after beginning of the injection and cured in air. The strength and the coefficient of permeability were measured after 1, 7 and 28 days, respectively to obtain the following results:

| mixing ratio of prepolymer to water | | Unconfined compression strength (Kg/cm²) | | | Coefficient of permeability |
|---|---|---|---|---|---|
| Prepolymer (parts) | Water (parts) | $\alpha 1$ | $\alpha 7$ | $\alpha 28$ | (cm/sec.) |
| 50 | 950 | 0.86 | 1.80 | 3.35 | $2.72 \times 10^{-5}$ |
| 100 | 900 | 2.28 | 3.58 | 4.78 | $9.4 \times 10^{-6}$ |
| 200 | 800 | 4.48 | 5.70 | 6.60 | $1.2 \times 10^{-6}$ |
| 400 | 600 | 10.40 | 13.20 | 16.20 | $8.5 \times 10^{-9}$ |

EXAMPLE 3

Toyoura standard sand was compacted to a dry density of 1.631 g/cm³ in a mold of 15 cm in inside diameter and 17.5 cm in height provided with a top and a bottom cover. A mixture of Prepolymer (4) of Preparation Example 4 and water was injected into the compacted sand through an inlet of the bottom cover. The frame was removed 1 hour after commencement of the injection, and the effective solidification rate [ percentage of the ratio of the actually solidified volume to the theoretically solidified volume (in the case of spherical percolation and 100 percent filling up) ] was measured to obtain the following results, in which the injection pressure was 1 Kg/cm² and the injected amount was 100 ml.

| mixing ratio of prepolymer to water | | Injection time (seconds) | Effective solidification rate (%) |
|---|---|---|---|
| Prepolymer (parts) | Water (parts) | | |
| 50 | 950 | 8 | 150 |
| 100 | 900 | 12 | 210 |
| 200 | 800 | 22 | 230 |
| 400 | 600 | 30 | 362 |

EXAMPLE 4

Toyoura standard sand was compacted in the same mold as in Example 1 so as to obtain the maximum dry density at the optimum water content of 16.2 percent to form a sample soil. Ten parts of Prepolymer (6) of Preparation Example 6 and 90 parts of water were mixed in a pressure pot, and the resulting mixture was injected into the sample soil from the bottom of the mold for 3 min. and cured for a day therein.

The solidified material had a strength of 2.17 Kg/cm², $E'_{50}$ of 29.7 Kg/cm² and a coefficient of permeability of $2.49 \times 10^{-7}$ cm/sec.

EXAMPLE 5

Prepolymer (9) of Preparation Example 9 diluted with methyl ethyl ketone to 75 percent was injected into a sand layer through which water was flowing at a rate of 0.32 cm/sec. The injection pressure was 0.5 Kg/cm², the injected amount was 150 ml. and the injection time was 60 sec. Consequently, the prepolymer was solidified in the form of a sphere toward the bottom from the position 6 cm. below the top of the sand layer. The solidified amount was 1,080 cm³ and the strength was 8.3 Kg/cm². Water was cut off almost completely 7 min. after commencement of the injection. The test apparatus had a steel cylinder of 10 cm. in inside diameter and 60 cm. in height and provided with a flow-speed controlling cock at the bottom and a device to keep a constant water level at the top. Toyoura standard sand was charged between the position 10 cm. below the top and the position 50 cm. below there to form a layer of 40 cm., and both ends of the layer were supported by a perforated plate and a wire net. An injection tube having an inside diameter of 5 mm. was inserted vertically to a depth of 10 cm. at the center. The injection liquid was placed in a glass cylinder vessel, which was connected to the injection tube through a polyvinyl chloride tube, and injected through the tubes into the sample soil under pressure by means of a compressor.

EXAMPLE 6

By using the same apparatus as in Example 4, 150 ml. of the solution obtained by diluting Prepolymer (9) of Preparation Example 9 with methyl ethyl ketone to 75 percent was injected into a sand layer, through which water was flowing at a rate of 0.48 cm/sec., at an injection pressure of 0.5 Kg/cm² in 60 sec. As a result, the injected material was solidified in the form of a cylinder from the position 10 cm. below the top of the sand layer and the solidified amount was 1450 cm³ and the strength was 7.5 Kg/cm³. The water was almost completely cut off 5 min. after beginning of the injection.

EXAMPLE 7

One hundred and fifty ml. of a homogeneous solution obtained by mixing 75 parts of Prepolymer (9) of Preparation Example 9, 0.5 part of tolylene diamine, 0.5 part of silicone oil (X–520 of Union Carbide Corporation) and 24 parts of methyl ethyl ketone was injected into s sand layer, through which water was flowing at a rate of 0.64 cm/sec., at an injection pressure of 0.8 Kg/cm² in
30 sec. in the same manner as in Example 4 by use of the same apparatus as in Example 4.

Consequently, the injected material was solidified in the form of a cylinder from the position 10 cm. below the top of the sand layer. The solidified amount was 1950 cm³ and the strength was 10.5 Kg/cm². The water was almost completely cut off 3 min. after beginning of the injection.

EXAMPLE 8

Sand was placed in a box-type iron testing apparatus having a length of 3 m, a width of 0.3 m and a height of 0.3 m and provided with a top cover and compacted to a voidage of 41 percent. The apparatus was so designed that water could be allowed to flow at a rate of 0.54 cm/sec. from one end to the other of the apparatus by means of a turbine pump. An injection pipe was inserted to a depth of 0.15 m vertically at the position 0.8 m apart from the water inlet and Prepolymer (9) of Preparation Example 9 was injected.

The injection pressure was 1.5 Kg/cm², the injection time was 90 sec. and the injected amount was 5 l.

Consequently, the flowing water was almost completely cut off about 10 min. after beginning of the injection. The solidified material had a volume of about 301 (effective solidification rate: 270 percent), a strength of 8 to 10 Kg/cm$^2$ and a coefficient of permeability of $2 \times 10^{-8}$ cm/sec.

EXAMPLE 9

Sand was charged into a box-type iron testing apparatus having a length of 3 m, a width of 0.3 m and a height of 0.3 m and provided with a top cover and compacted to a voidage of about 41 percent. The apparatus was so designed that water could be allowed to flow therethrough at a rate of 0.95 cm/sec. from one end to the other of the apparatus by means of a turbine pump. An injection pipe was inserted to a depth of 0.15 m vertically at the position 0.8 m apart from the water inlet and Prepolymer (11) of Preparation Example 11 was injected through the pipe. The injection pressure was 1.5 Kg/cm$^2$, the injection time was 90 sec. and the injected amount was 5 l.

Consequently, the flowing water was almost completely cut off about 6 min. after beginning of the injection. The solidified material had a volume of about 36 l. (effective solidification rate: 325 percent, a strength of 5 to 6 Kg/cm$^2$ and a coefficient of permeability of $8 \times 10^{-8}$ cm/sec.

EXAMPLE 10

A pit sand produced in Togane, Chiba, Japan was statically compacted to a density of 1.56 g/cm$^3$ at the optimum water content of 14.2 percent (coefficient of permeability: $5.26 \times 10^{-4}$ cm/sec.) in the same mold as in Example 1. At the center of the thus prepared sample soil there was provided a sand column having a diameter of 13 mm. from the top of the mold to the center of the sample soil. A homogeneous solution of 10 parts of Prepolymer (13) of Preparation Example 13 and 90 parts of water was injected into the sample soil from the sand column at a pressure of 0.5 Kg/cm$^2$ in 3 min. and cured for a day. The effect of injection was estimated from the penetration resistance measured by a cone penetrometer (a flat head penetration rod having a cross-sectional area of 0.2 cm$^2$). In the case of a sample soil unsaturated with water, the penetration strength was 35 to 58 Kg/cm$^2$ (this was 5.8 to 8.4 times that of untreated sample soil).

EXAMPLE 11

Sand was charged into a box-type iron testing apparatus having a length of 3 m, a width of 0.3 m and a height of 0.3 m and provided with a top cover and then compacted so that the voidage was 41 percent. The apparatus was so designed that water could be allowed to flow therethrough at a rate of 1.34 cm/sec. from one end to the other of the apparatus by means of a turbine pump. An injection pipe was inserted vertically to a depth of 0.15 m at the position 0.8 m apart from the water inlet, and Prepolymer (14) of Preparation Example 14 was injected through the pipe.

The injection pressure was 1.5 Kg/cm$^2$, the injection time was 90 sec. and the injected amount was 5 l.

Consequently, the flowing water was almost completely cut off. The solidified material had a volume of about 40 l. (effective solidification rate: 360 percent), a strength of 4 to 5 Kg/cm$^2$ and a coefficient of permeability of $5 \times 10^{-8}$ cm/sec.

EXAMPLE 12

One hundred and fifty ml of a homogeneously mixed solution of 75 parts of Prepolymer (15) of Preparation Example 15 and 25 parts of methyl ethyl ketone was injected into a sand layer, through which water (20°C) was flowing at a rate of 0.48 cm/sec., at a pressure of 0.5 Kg/cm$^2$ in 60 sec. by means of the same apparatus as in Example 6 in the same manner as in Example 7

Consequently, the injected material was solidified in the form of a substantial sphere from the position 8 cm below the top of the sand layer and the solidified material had a volume of 1,520 cm$^3$ and a strength of 9.1 Kg/cm$^2$. The water was almost completely cut off 4 min. after beginning of the injection.

EXAMPLE 13

Toyoura standard sand was compacted so that the maximum dry density was obtained at the optimum water content of 16.2 percent in the same mold as in Example 1 to prepare a sample soil. 10 parts of Prepolymer (16) of Preparation Example 16 and 90 parts of water (20°C, industrial water) were mixed together. The resultant homogeneous transparent solution was injected into the sample soil from the bottom of the mold at a pressure of 0.5 Kg/cm$^2$ in 3 min. The sample withdrawn after having been cured for a day after the injection had a strength of 6.4 to 7.7 Kg/cm$^2$, a modulus of deformation, $E'_{50}$, of 55 Kg/cm$^2$, and a coefficient of permeability of $3.15 \times 10^{-8}$ cm/sec.

EXAMPLE 14

Toyoura standard sand was compacted in the same mold as in Example 1 and a sand column having a diameter of 13 mm and a depth of 75 mm was provided at the center of the compacted sand, and the upper portion thereof was sealed with clay to prepare a saturated sample soil. 250 ml of a solution of 75 parts of Prepolymer (16) of Preparation Example 16 in 25 parts of methyl ethyl ketone were injected from the sand column at a pressure of 0.5 Kg/cm$^2$ in one mixture and cured for a day.

Consequently, the prepolymer was solidified in a conical form and the solidified material had a volume of 1,730 cm$^3$, a strength of 45.0 Kg/cm$^2$ and a coefficient of permeability of $6.32 \times 10^{-8}$ cm/sec.

EXAMPLE 15

Toyoura standard sand was compacted in the same mold as in Example 1 so that the maximum dry density was obtained at the optimum water content of 16.2 percent to prepare a sample soil. 10 parts of Prepolymer (18) of Preparation Example 18 and 90 parts of water were mixed in a pressure pot, and the resulting mixture was injected from the bottom of the mold at a pressure of 0.5 Kg/cm$^2$ in 3 min. and cured for a day in the mold.

The solidified material had a strength of 4.30 Kg/cm$^2$, a modulus of deformation, $E'_{50}$, of 86 Kg/cm$^2$ and a coefficient of permeability of $8.30 \times 10^{-8}$ cm/sec.

EXAMPLE 16

Sand was charged into a box-type iron testing apparatus having a length of 3 m, a width of 0.3 m and a height of 0.3 m and provided with a top cover, and then compacted so that the voidage was about 41 percent.

The apparatus designed so that water could be allowed to flow therethrough at a rate of 1.36 cm/sec. from one end to the other of the apparatus by means of a turbine pump. An injection pipe was inserted vertically to a depth of 0.15 m at the position 0.8 m apart from the water inlet, and Prepolymer (19) of Preparation Example 19 was injected into the sand.

The injection pressure was 1.5 Kg/cm$^2$, the injection time was 90 sec. and the injected amount was 5 l.

Consequently, the flowing water was almost completely cut off in about 6 min. after beginning of the injection. The solidified material had a volume of about 39 l. (effective solidification rate: 350 percent), a strength of 4 to 5 Kg/cm$^2$ and a coefficient of permeability of $8 \times 10^{-8}$ cm/sec.

EXAMPLE 17

A sample soil was prepared by use of the same apparatus under the same conditions as in Example 4.

The top of the mold was sealed with clay and 200 ml of a solution of 75 parts of Prepolymer (20) of Preparation Example 20 in 25 parts of methyl ethyl ketone were injected at a pressure of 0.5 Kg/cm$^2$ in 1 minute. After curing for a day, the solidified material was withdrawn to find that it was in a conical form and that the volume of the solidified material was 1,850 cm$^3$, the unconfined compression strength was 110 to 135 Kg/cm$^2$ and the coefficient of permeability was $2 \times 10^{-7}$ to $8 \times 10^{-7}$ cm/sec.

EXAMPLE 18

Sand produced in Togane, Chiba, Japan was statically compacted at the optimum water content (coefficient of permeability: $5.26 \times 10^{-4}$ cm/sec; density: 1.56 g/cm$^3$) in a mold.

In the prepared sample soil there was provided a sand column of 13 mm in diameter which was extended top of the mold to the central portion of the sample soil. A homogeneously mixed solution of 10 parts of Prepolymer (20) of Preparation Example 20 and 90 parts of water was injected at a pressure of 0.5 Kg/cm$^2$, in 3 min. and cured for a day.

The injection effect was estimated by the penetration resistance measured by a cone penetrometer (a flat head penetration rod having a cross-sectional area of 0.2 cm$^2$).

In the case of water-unsaturated sample soil, the penetration strength was 42 to 72 Kg/cm$^2$ (8.0 to 11.5 times that of the untreated soil), while in the case of water-saturated sample soil, the penetration strength was 48 to 68 Kg/cm$^2$ (8.5 to 10.0 times that of the untreated soil). The injection apparatus and the mold employed were the same as in Example 4.

EXAMPLE 19

Toyoura standard sand was compacted to the maximum dry density at he optimum water content of 16.2 percent in the same mold as in Example 1 to obtain a sample soil. 10 parts of Prepolymer (20) of Preparation Example 20 and 90 parts of water were mixed in a pressure pot and the resulting mixture was injected into the soil from the bottom of the mold at a pressure of 0.5 Kg/cm$^2$ in 3 min. and then cured for a day in the mold.

The solidified material had a strength of 10.8 kg/cm$^2$, a modulus of deformation, $E'_{50}$, of 87 Kg/cm$^2$ and a coefficient of permeability of $2.60 \times 10^{-8}$ cm/sec.

EXAMPLE 20

Toyoura standard sand was compacted to the maximum dry density at the optimum water content of 16.2 percent in the same mold as in Example 1 to obtain a sample soil. 10 parts of Prepolymer (22) of Preparation Example 22 and 90 parts of water were mixed in a pressure pot and the resulting mixture was injected into said soil from the bottom of the mold at a pressure of 0.5 Kg/cm$^2$ in 3 min. and then cured for a day in the mold.

The solidified material had a strength of 2.02 Kg/cm$^2$, a modulus of deformation, $E'_{50}$, of 38.3 Kg/cm$^2$ and a coefficient of permeability of $1.31 \times 10^{-7}$ cm/sec.

EXAMPLE 21

In order to see the applicability as a grout of Preparation Example 13, injection was carried out under conditions near to the actual injection in site. The mold was a steel cylinder having an inside diameter of 1.00 m, a height of 1.15 m and an inner volume of 0.9 m$^3$, and it could be divided into two sections, right and left. Further, there was a pressure chamber in the top pressure cover, and a pressure load of 1.5 to 2.0 Kg/cm$^2$ was applied downwards to the sample soil in the mold.

At the center of the pressure cover, there was a hole of 12 cm in diameter, and an injection pipe was buried therein under pressure, through which the prepolymer was injected into the soil. Pit sand in 3 layers was compacted with a rammer to to prepare a sample soil having a coefficient of permeability of $3 \times 10^{-4}$ cm/sec. There was provided a banking (loam) of about 10 cm in order to prevent the grout sample from flowing out. At the center of the mold, there was inserted an injection pipe (18 mm in outer diameter and 12.5 mm in inside diameter) and injection was effected therethrough.

Twelve Kg of Prepolymer (13) of Preparation Example 13 and 148 l of water (containing dissolved therein 60 g of tolylene diamine and 60 g of sodium hydroxide) were mixed with agitation, and 100 l. of the resulting mixture was injected by means of a double injection pump from the head of the injection pipe at a pressure of 1.30 to 1.70 Kg/cm$^2$ at a rate of 13 l./min. in 8 min.

Consequently, a uniform spherical solidification was obtained and the solidified material had a strength of 3.5 Kg/cm$^2$, a modulus of deformation, $E'_{50}$, of 38.5 Kg/cm$^2$, a cohesion of 1.06 Kg/cm$^2$, an internal friction angle of 30° and an N value of 15/30 cm measured according to the standard penetration test.

EXAMPLE 22

When the sandy ground was cut to a depth of 9 m, the underground water flowed violently therein together with the back side clay below the horizontal sheet pile for lagging. Therefore, Prepolymer (4) of Preparation Example 4 diluted to 90 percent with methyl ethyl ketone was injected thereinto in the following manner to prevent the flowing of water:

Injection holes were made through sheet pile, an injection rod of 1 m. was pushed in the back side sand layer through the hole, and the above mixture was injected under pressure by means of a hand injection pump.

The injected amount per hole was about 5 l. and the injection pressure ranged from 0.5 to 2 Kg/cm² and the injection time was about 4 min. The injection under the above conditions was carried out as to several 10 holes.

The spring water was almost completely cut off about 4 min. after the injection at each hole.

EXAMPLE 23

Spring water flowed violently out of the facing in the shield construction in the sandy ground 25 m under the surface of the ground, whereby continuation of the construction became impossible. Five borings were made from the surface of the ground towards the facing, and at each boring hole, Prepolymer (6) of Preparation Example 6 and water were separately sucked in a predetermined ratio at a 1 m pitch by an injection pump to be sent to a Y-shaped tube at the top of the injection rod, where the two liquids were mixed and then injected into the ground through the injection rod.

The injected amount per pitch was 25 l. of Prepolymer (6) and 50 l. of water. The injection pressure was in the range from 2 to 4 Kg/cm² in any case and injection was readily carried out. The spring water from the facing was reduced markedly by the injection, and the practice of the shield construction became again possible.

EXAMPLE 24

A homogeneous mixture of 5 parts of Prepolymer (4) and 95 parts of water was sprinkled uniformly onto the slope having a gradient of 30° and composed of fine sand. The sprinkled amount per unit area was fixed as 2.0 l./m². After allowing to stand for 1 hour after sprinkling, a uniform rain at a raining strength of 2,500 mm/hr. was given continuously to the slope. No breakdown of the slope was observed oven after 7 hrs. have elapsed.

The thickness of the protective layer formed by the polymerization reaction of the prepolymer with water ranged from 6 to 14 mm.

EXAMPLE 25

After water had previously been sprinkled uniformly over the slope composed of fine sand and having a gredient of 30° at a rate of 2.0 l./m², Prepolymer (23) was sprinkled thereover uniformly at a rate of 0.5 l./m². After allowing the liquids to stand for 24 hrs. after sprinkling, a uniform rain of a raining strength of 2,500 mm/hr. was continuously applied thereto. No breakdown of the slope was observed at all even after 7 hours had elapsed. The thickness of the protective layer formed by the polymerization reaction of the prepolymer with water ranged from 3 to 6 mm.

EXAMPLE 26.

Twenty parts of Prepolymer (24) and 80 parts of water were mixed with stirring and the resulting mixture was sprinkled uniformly over the surface of the road composed of clay-loam difficult to walk thereon. The amount sprinkled was 5 l./m². Walking became possible on the surface of the road after 7 hrs. have elasped after sprinkling.

The thickness of the protective layer formed by the polymerization reaction of the prepolymer and water was 35 mm.

What we claim is:

1. A soil stabilization method which comprises applying to soil a water-soluble polyurethane prepolymer having terminal isocyanate groups, said prepolymer being the reaction product of an ethylene oxide-propylene oxide copolymer having the ethylene oxide unit and the propylene oxide unit in a ratio of from 90/10 to 70/30 with a polyisocyanate compound having at least two isocyanate groups, and reacting the prepolymer with water in the soil to solidify the same.

2. A method according to claim 1, wherein the polyisocyanate compound is selected from the group consisting of tolyene diisocyanate, diphenylmethane diisocyanate, diphenyl diisocyanate, naphthalene diisocyanate, xylylene diisocyanate, hexamethylene diisocyanate and triphenylmethane triisocyanate.

3. A method according to claim 1, wherein the amount of water is in great excess of the theoretical amount.

4. A method according to claim 1, wherein the polyurethane prepolymer is injected through an injection pipe into the soil under pressure and said polyurethane prepolymer is reacted with the water present in the soil.

5. A method according to claim 1, wherein a mixture of a polyurethane prepolymer and water in an amount 20 or less times the weight of the prepolymer is injected through an injection pipe into the soil under pressure and the polyurethane prepolymer is reacted with the water in the soil.

6. A method according to claim 1, wherein the polyurethane prepolymer contains a basic material.

7. A method according to claim 6, wherein the basic material is an amine compound.

8. A method according to claim 1, wherein the polyurethane prepolymer contains an acidic material.

9. A method according to claim 1, wherein the polyurethane prepolymer is mixed with an inorganic material 10. A method according to claim 9 wherein the inorganic material is selected from the group consisting of clay, cement and a mixture thereof.

11. A method in accordance with claim 1 comprising first mixing said prepolymer with water and then applying the mixture to the soil and reacting said mixture in the soil.

12. A method in accordance with claim 1 comprising applying said prepolymer to the soil and reacting same with water already present in the soil.

13. A soil stabilization method which comprises applying to soil a water-soluble polyurethane prepolymer having terminal isocyanate groups, and reacting the prepolymer with water in the soil to solidify the same, the steps wherein the polyurethane prepolymer is sprinkled over the slope composed of soil, percolated into the soil and reacted with the water present in the soil or rain to form a protective layer on the surface part of the slope.

14. A soil stabilization method which comprises applying to soil a water-soluble polyurethane prepolymer having terminal isocyanate groups, and reacting the prepolymer with water in the soil to solidify the same, the steps wherein water is sprinkled artificially over the slope comprised of soil, subsequently the polyurethane prepolymer is sprinkled and percolated into the soil, and the two are then reacted with each other in the soil to form a protective layer on the surface part of the slope.

15. A soil stabilization method which comprises applying to soil a water-soluble polyurethane prepolymer having terminal isocyanate groups, and reacting the prepolymer with water in the soil to solidify the same, wherein the polyurethane prepolymer is sprinkled over the slope composed of soil to be percolated into the soil, subsequently water is sprinkled thereover to be percolated into the soil, and the two are reacted with each other to form a protective layer on the surface part of the slope.

16. A soil stabilization method which comprises applying to soil a water-soluble polyurethane prepolymer having terminal isocyanate groups, and reacting the prepolymer with water in the soil to solidify the same, wherein a mixture of polyurethane prepolymer and water in an amount 50 or less times the weight of the prepolymer is sprinkled over the slope composed of soil to percolate the same into the soil and the two are reacted with each other in the soil to form a protective layer on the surface part of the slope.

17. A soil stabilization method which comprises applying to soil a water-soluble polyurethane prepolymer having terminal isocyanate groups, and reacting the prepolymer with water to solidify the same, wherein the polyurethane prepolymer alone or a mixture thereof with water in an amount 20 or less times the weight of the prepolymer is sprinkled over a weak ground to percolate the same into the soil and the two are reacted with each other in the soil to form a protective layer on the surface part.

18. A soil stabilization method which comprises applying to soil a water-soluble polyurethane prepolymer having terminal isocyanate groups, and reacting the prepolymer with water to solidify the same, wherein the polyurethane prepolymer alone or a mixture thereof with water in an amount 20 to less times the weight of the prepolymer is mixed with the soil of the surface part of weak ground with agitation to form a protective layer on the surface part.

19. A soil stabilization method which comprises applying to soil a water-soluble polyurethane prepolymer having terminal isocyanate groups, and containing acid chloride, and reacting the prepolymer with water in the soil to solidify the same.

20. A soil stabilization method which comprises applying to soil a water-soluble polyurethane prepolymer having terminal isocyanate groups and containing a chelate compound and reacting the prepolymer with water in the soil to solidify the same.

* * * * *